April 8, 1924.　　　　　　　G. ODUM　　　　　　　1,489,396
AIR VALVE
Filed June 16, 1921　　　2 Sheets-Sheet 2
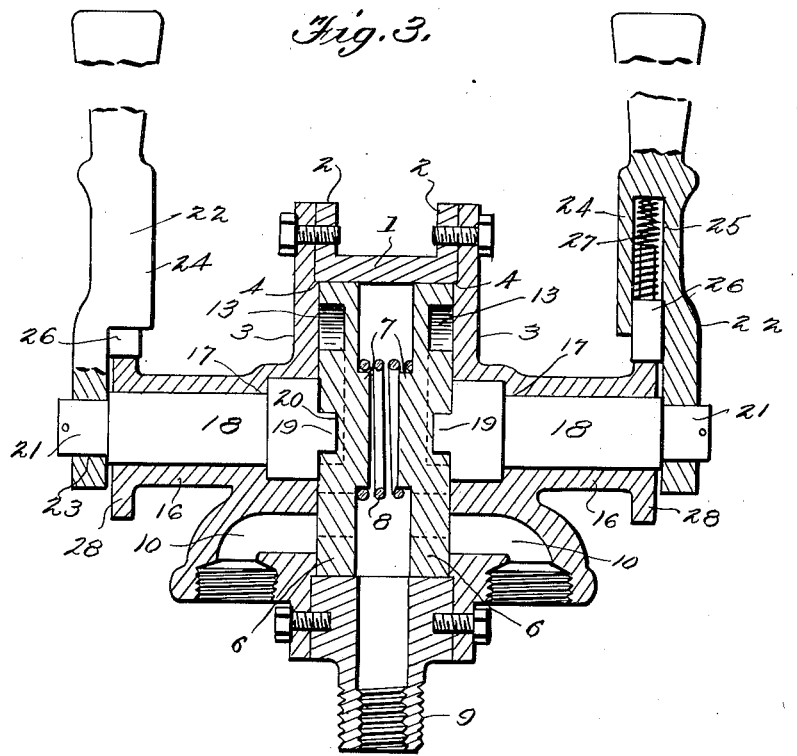
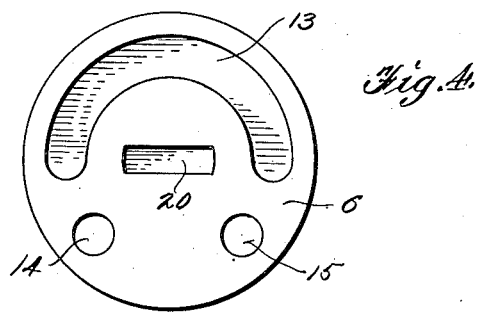
Inventor
G. Odum,
By　T. P. Jorin
Attorney Patented Apr. 8, 1924.

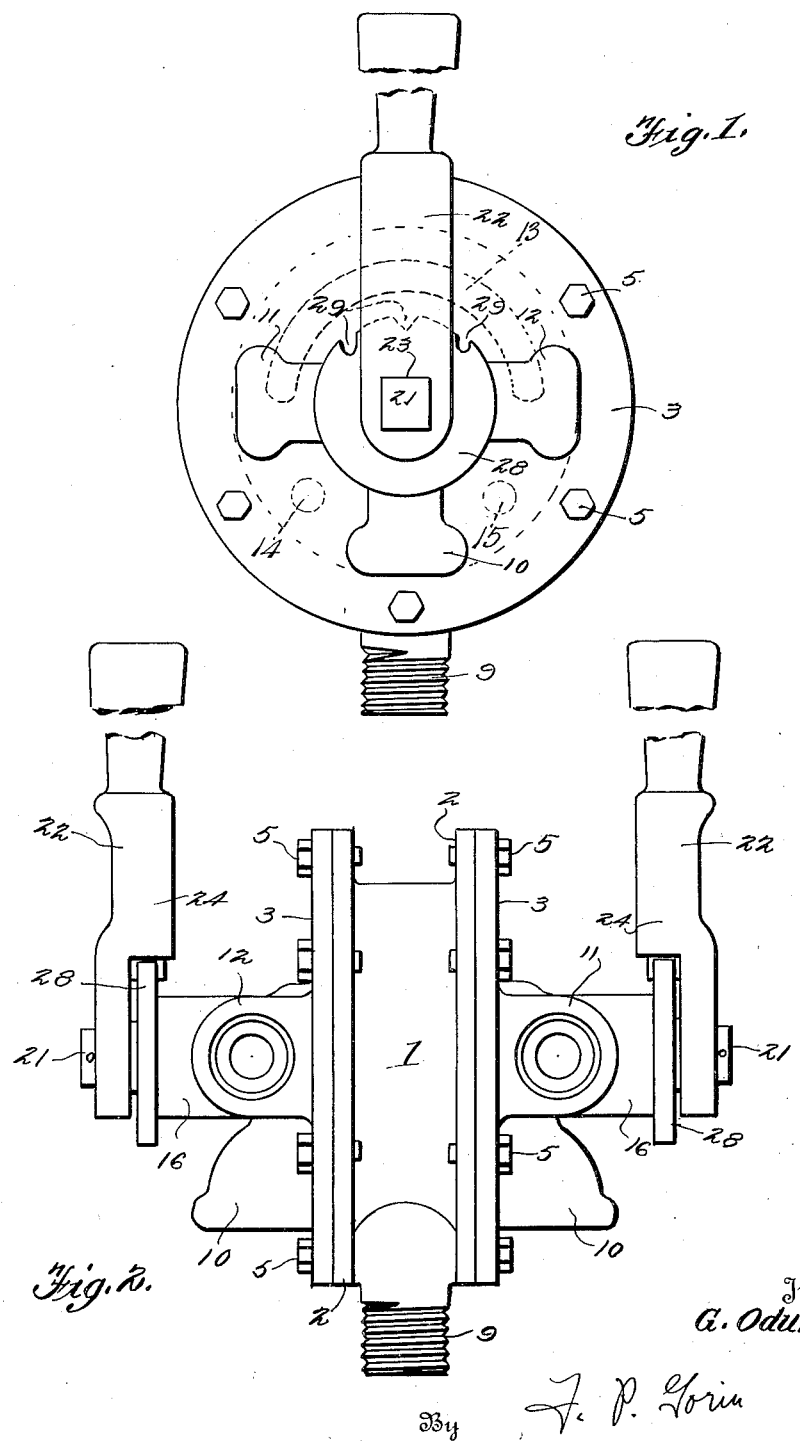

1,489,396

UNITED STATES PATENT OFFICE.

GEORGE ODUM, OF CHICAGO, ILLINOIS.

AIR VALVE.

Application filed June 16, 1921. Serial No. 478,191.

*To all whom it may concern:*

Be it known that I, GEORGE ODUM, a citizen of the United States of America, residing at 9030 Buffalo Ave., Chicago, in the county of Cook and State of Illinois, have invented certain new and useful Improvements in Air Valves, of which the following is a specification.

This invention relates to an improvement in air valves and particularly to an air valve designed for use in operating clutches by air, as an equalizing valve, and for use on ore bridges.

The invention comprises a valve having independently operable valve members, whereby distribution of pressure to two or more independent points may be simultaneously or independently controlled. Furthermore, the valve is constructed to utilize the air pressure within the valve as a means for holding the valve member to its seat, to thereby avoid the necessity for the accurate fitting and seat grinding usually employed in valves of this type.

In the drawings:

Fig. 1 is a face view of the valve.

Fig. 2 is a side elevation thereof.

Fig. 3 is a vertical section.

Fig. 4 is a face view of one of the valve discs.

The improved valve comprises what may be termed a shell or casing 1, formed as a cylindrical body having end flanges 2. End plates 3, of duplicate construction, are adapted to close the ends of the body, said end plates being slightly offset to fit within the end edges of the casing as at 4 and overlying the flanges 2, to which flanges said end plates are secured by bolts 5.

Opposing valve members 6, of duplicate formation, are arranged for a rotary fit within the casing, the proximate surface of these valves being formed with bosses 7 to receive the end coils of a coil spring 8, whereby the valve members are held in spaced relation and in close contact with the respective end plates. The casing 1 is formed at its lower end with an inlet projection 9 to deliver compressed air or other fluid under pressure into the casing between the valve members, this inlet projection being preferably interiorly and exteriorly threaded to provide for the connection of any service conduit or pipe thereto.

Each end plate is provided with three outlets formed as an integral projection from said end plate with the terminals of said outlets threaded for the connection of service pipes thereto. The central outlet 10 is arranged in the same vertical plane as the inlet 9 and at the lowermost portion of the end plate, while the remaining outlets 11 and 12 are arranged approximately in transverse alignment at right angles to the plane of the inlet. These outlets communicate with the interior of the valve casing, except for the interposed valve member.

The valve members 6 are formed on the surface next the end plates 3 with a semiannular channel 13, which in the normal position of the valve, occupies the upper portion of said face. Immediately below the terminals of the channel 13, the valve member is formed with ports 14 and 15, so spaced that in the normal position of the valve member, they are arranged between the central outlet 10 and the side outlets 11 and 12. Thus the interior of the valve casing can only communicate with the respective outlets thru the ports 14 and 15.

Each end plate is centrally formed with an outstanding sleeve member 16, which immediately beyond the outer surface of the end plate, is reduced in interior diameter as at 17. A turning plug 18 fits within the interior of the sleeve member, conforming to both the normal and reduced diameter, the turning plug is formed at its inner end with a non-circular projection 19 adapted to accurately fit a corresponding recess 20 in the valve member, whereby the valve member may be turned in operation of the plug. The outer or free end of each plug presents an angular extension 21, and an operating lever 22 is provided having an opening 23 to correspond to and fit the projection 21, whereby in the operation of the lever, the plug and thereby the valve member may be actuated. The operating lever has an inwardly offset enlargement 24 cored at 25 to receive a locking pawl 26 with which a spring 27, seated in the cored portion 25 of the enlargement, cooperates to maintain the locking pawl in operative position. The sleeve member 16 is formed at the outer end with a lateral flange 28, and the upper portion of this flange is formed with locking notches 29 with which the pawl 26 cooperates.

The arrangement of the parts described is such that when the operating lever is in what may be termed the vertical position, that is, with the pawl 26 thereof engaging the central locking notch 29, the valve is in a closed or neutral position, the channel 13 communicating at its respective ends with the outlets 11 and 12, while the ports 14 and 15 are closed by the end plate. If the lever is moved to one of the side notches, as for example, toward the right as shown in Fig. 1, the port 14 will register with the outlet 11, while the port 15 registers with the outlet 10. Compressed air from the interior of the casing is thus free to pass thru said outlets. If the operating lever is moved to the other extreme position, the outlets 10 and 12 are in communication with the interior of the casing. In the neutral position, it will be understood that the outlets 11 and 12 are in communication thru the channel 13 of the valve plate, as shown in Fig. 1, and air compression is thus equalized thru the valve.

In the construction described, it is noted that the valve parts are duplicated, and that thereby the fluid under pressure may be similarly distributed to two independent sources or independently controlled to or from said sources by proper operation of the operating levers for the respective valve members. It will be further noted that the interior of the casing is open to the pressure in the motive fluid, and hence the valves are held by this pressure against the end plates, and are thus held in substantially non-leakage relation in the valve casing, without the necessity of the usual grinding of the valve seats for the accurate fitting of the valve members.

Claims:

1. A valve including a cylindrical casing having an inlet and a plurality of spaced outlets, a rotary disc valve mounted in said casing and formed with a channel to establish independent communication between two of the outlets in the neutral position of the valve disc, said valve disc being also formed with spaced openings adapted in movement in one direction to establish communication between the inlet and at least two of the outlets and in movement in the opposite direction to establish communication between the inlet and at least two outlets, said valve in either position always communicating with a particular one of the outlets.

2. A valve including a cylindrical casing formed with an inlet, end plates carried thereby provided with a plurality of outlets, a pair of disc valves mounted in the casing, said inlet directing pressure between said valves to force them outwardly for sealing cooperation with the casing, said valves being formed to provide communication between the inlet and one or more outlets in either one of two positions of said valves, and to provide communication between two or more of said outlets when said valve is in position to cut off the inlet.

3. A valve including a cylindrical casing formed with an inlet in the central portion, end plates secured to the casing, each formed with a plurality of outlet ports, a pair of disk valves mounted in the casing, one adjacent each end plate, resilient means between the valves for forcing them toward the end plates, and means in the end plates for operating the valves, said valves being formed to provide communication between the inlet and one or more outlets and to provide communication between two or more outlets when the inlet is cut off.

In testimony whereof I affix my signature.

GEORGE ODUM.